(12) United States Patent
Rumer et al.

(10) Patent No.: US 9,086,333 B2
(45) Date of Patent: Jul. 21, 2015

(54) EXAMINATION SYSTEM FOR ELECTRIC VEHICLE OR HYBRID ELECTRIC VEHICLE

(75) Inventors: Richard Rumer, Mount Clemens, MI (US); Steve Witter, Ann Arbor, MI (US); Masahiro Yao, Kyoto (JP); Kazuhisa Sasahara, Kyoto (JP); Mineyuki Komada, Kyoto (JP)

(73) Assignee: HORIBA Instruments Incorporated, Kyoto-shi (JP)

( * ) Notice: Subject to any disclaimer, the term of this patent is extended or adjusted under 35 U.S.C. 154(b) by 151 days.

(21) Appl. No.: 13/162,544

(22) Filed: Jun. 16, 2011

(65) Prior Publication Data

US 2012/0323417 A1    Dec. 20, 2012

(51) Int. Cl.
| | |
|---|---|
| *B60L 11/00* | (2006.01) |
| *B60K 6/00* | (2006.01) |
| *G01M 15/02* | (2006.01) |
| *G01M 15/04* | (2006.01) |
| *B60K 6/26* | (2007.10) |
| *B60K 6/28* | (2007.10) |
| *B60W 10/26* | (2006.01) |
| *B60W 10/08* | (2006.01) |

(52) U.S. Cl.
CPC ............ *G01M 15/02* (2013.01); *G01M 15/044* (2013.01); *B60K 6/26* (2013.01); *B60K 6/28* (2013.01); *B60W 10/08* (2013.01); *B60W 10/26* (2013.01); *Y02T 10/6286* (2013.01)

(58) Field of Classification Search
CPC .............. B60K 6/00; B60K 6/22; B60K 6/26; B60K 6/28; B60K 6/365; B60K 6/387; B60K 6/40; B60K 6/445; B60K 6/48; B60W 20/00; B60W 10/06; B60W 10/08; B60W 10/26; Y02T 10/62; Y02T 10/6221; Y02T 10/6286; Y02T 10/70; Y02T 10/7005; Y02T 10/7077; G01M 15/02; G01M 15/044

USPC ........ 701/1, 22; 903/903, 904, 906, 907, 914; 180/65.1, 65.21, 65.265, 65.285, 180/65.29; 318/139; 320/104

See application file for complete search history.

(56) References Cited

U.S. PATENT DOCUMENTS

| | | | | |
|---|---|---|---|---|
| 4,313,080 A | * | 1/1982 | Park | 320/123 |
| 5,722,502 A | * | 3/1998 | Kubo | 180/65.23 |

(Continued)

FOREIGN PATENT DOCUMENTS

| | | | | | |
|---|---|---|---|---|---|
| JP | H-07274309 A | * | 10/1995 | | B60L 11/18 |
| JP | 2001091410 A | * | 4/2001 | | B60L 11/18 |

(Continued)

*Primary Examiner* — Jack W Keith
*Assistant Examiner* — Chuong P Nguyen
(74) *Attorney, Agent, or Firm* — Alleman Hall McCoy Russell & Tuttle LLP

(57) ABSTRACT

The present invention is able to perform an examination of a motor mounted on EV or HEV (HV) as well as charge and discharge of a battery mounted on EV or HEV (HV), by a single system. The system includes a dynamometer coupled to an output shaft of a motor, a power supply unit for supplying power to the motor or the dynamometer, a motor examination circuit for supplying the power of the power supply unit to the dynamometer and the motor, a battery charge and discharge circuit connected with a battery, for supplying the power of the power supply unit to the battery or discharging the power of the battery, and a circuit switching mechanism for switching between the motor examination circuit and the battery charge and discharge circuit.

7 Claims, 2 Drawing Sheets

(56) References Cited

U.S. PATENT DOCUMENTS

| | | | |
|---|---|---|---|
| 6,426,608 B2 * | 7/2002 | Amano et al. | 320/163 |
| 7,448,458 B2 * | 11/2008 | Meyer | 180/65.31 |
| 7,584,813 B2 * | 9/2009 | Yoshida | 180/65.29 |
| 8,037,743 B2 * | 10/2011 | Ichige et al. | 73/116.05 |
| 8,143,843 B2 * | 3/2012 | Ichikawa | 320/104 |
| 8,234,029 B2 * | 7/2012 | Ando | 701/22 |
| 2007/0205746 A1 * | 9/2007 | Iida et al. | 320/151 |
| 2011/0093151 A1 * | 4/2011 | Kojima et al. | 701/22 |
| 2012/0123619 A1 * | 5/2012 | Chen et al. | 701/22 |

FOREIGN PATENT DOCUMENTS

| | | | | |
|---|---|---|---|---|
| JP | 2002-090431 A | | 3/2002 | |
| JP | 2002090431 A | * | 3/2002 | B60L 3/00 |
| JP | 2007/139527 A | * | 6/2007 | B60L 7/22 |

* cited by examiner

EXAMINATION SYSTEM FOR ELECTRIC VEHICLE OR HYBRID ELECTRIC VEHICLE

FIELD OF THE INVENTION

The present invention relates to an examination system for examining, for example, an operating performance of a motor which is mounted on an electric vehicle (EV) or a hybrid electric vehicle (HEV).

BACKGROUND OF THE INVENTION

As a motor examination system for examining an operating performance of a motor that is used in an electric vehicle (EV) or a hybrid electric vehicle (HEV), as shown in Patent Document 1, what is considered is to mechanically connect the motor used in the EV or HEV with a dynamometer, which is a power absorption part, to measure a torque generated by the motor, thereby measuring, for example, an output torque of the motor. This examination system is provided with a power supply for supplying electric power to the dynamometer and another power supply for driving the motor.

Whereas, as a battery examination system for examining charge and discharge of a battery which is mounted on the EV or HEV, as shown in Patent Document 2, what is considered is to calculate a state of charge (SOC) based on battery information, including a temperature, voltage, and current of the battery, and control a charge and discharge device based on the state of charge data to uniformly maintain the state of charge of the battery. This examination system is provided with a battery power supply for charging and discharging the battery.

Conventionally, in order to perform both the examination of the motor for the EV or HEV and the charge and discharge of the battery for the EV or HEV, it is necessary to use both the motor examination system and the battery charge and discharge system.

However, if both the motor examination system and the battery charge and discharge system are used, it is necessary to provide the power supplies for the respective systems, as described above and, thus, increasing equipment cost as well as increasing the installation space. Moreover, in recent years, in order to imitate a state where both the motor and the battery are actually mounted on the EV or HEV to allow the whole EV or HEV performance to be inspected, it has been coming to install both the motor examination system and the battery charge and discharge system.

RELATED ART DOCUMENTS

Patent Documents

[Patent Document 1] JP2001-91410A
[Patent Document 2] JP2002-90431A

SUMMARY OF THE INVENTION

Problem(s) to be Solved by the Invention

Thus, the present invention has a primary object of making an examination of a motor that is mounted on an EV or HEV, as well as charge and discharge of a battery that is mounted on the EV or HEV, possible by a single system.

Means for Solving the Problem

That is, an electric vehicle examination system according to the present invention is characterized by including a dynamometer coupled to an output shaft of a motor that is mounted on an electric vehicle or a hybrid electric vehicle, a power supply unit for supplying power to the motor or the dynamometer, a motor examination circuit for supplying the power of the power supply unit to the dynamometer and the motor, a battery charge and discharge circuit connected with the battery that is mounted on the electric vehicle or the hybrid electric vehicle, for supplying the power of the power supply unit to the battery or discharging the power of the battery, and a circuit switching mechanism for switching between the motor examination circuit and the battery charge and discharge circuit.

According to such a configuration, since the motor examination circuit and the battery charge and discharge circuit are configured to be switched therebetween with respect to the power supply unit, an operating performance and the like of the motor can be examined by closing the motor examination circuit. Moreover, charge and discharge of the battery can also be performed by closing the battery charge and discharge circuit. Thus, the examination of the motor mounted on an EV or HEV, as well as charge and discharge of the battery mounted on the EV or HEV can be made possible by the single system. As a result, since there is no necessity of providing the power supply unit only for battery charge and discharge, an equipment cost and an installation space can be reduced. Furthermore, the battery charge and discharge circuit charges and discharges the battery, and the battery charged up to a desired state of charge (SOC) is connected with the motor as it is by switching the circuit, without moving the battery, thereby an examination of the motor using the battery can also be performed.

The electric vehicle examination system may preferably include an on/off switch provided to the battery charge and discharge circuit, for closing and opening the battery charge and discharge circuit, and a switch control unit for controlling on and off of the on/off switch. The switch control unit may preferably turn on the on/off switch when a difference between a voltage of the power supply unit and a voltage of the battery becomes within a predetermined range. Note that the voltage of the power supply unit is the output voltage of the power supply unit, and the voltage of the battery is the voltage between terminals. According to this, such a problem that, when the voltage of the power supply unit differs from the voltage of the battery, the circuit is cut off by a breaker, such as a fuse, of the battery or the like due to a large current beyond a rated current produced in the battery charge and discharge circuit, and charge and discharge is impossible, can be solved.

The difference between the voltage of the power supply unit and the voltage of the battery described above becomes the most remarkable when switching from the motor examination circuit to the battery charge and discharge circuit. Therefore, the switch control unit may preferably turn off the on/off switch before switching from the motor examination circuit to the battery charge and discharge circuit, and after changing from the motor examination circuit to the battery charge and discharge circuit, the switch control unit may preferably turn on the on/off switch when the difference between the voltage of the power supply unit and the voltage of the battery becomes within the predetermined range.

Preferably, the motor may be driven as an electric motor, and the dynamometer may be driven as a generator to charge power generated by the dynamometer into the power supply unit, or the dynamometer may be driven as an electric motor, and the motor may be driven as a generator to charge power generated by the motor into the power supply unit. According to this, since energy can be circulated within the motor examination circuit, energy saving can be achieved.

Effect of the Invention

According to the present invention configured in this way, it is possible to perform the examination of the motor that is mounted on the EV or HEV, as well as to perform the charge and discharge of the battery that is mounted on the EV or HEV, by the single system.

EMBODIMENT FOR CARRYING OUT THE INVENTION

Hereinafter, one embodiment of an examination system 100 for an electric vehicle according to the present invention is described with reference to the drawings.

The examination system 100 for the electric vehicle of this embodiment is used in order to perform an operating performance examination of a motor 200 that is mounted on an electric vehicle (EV) or a hybrid electric vehicle (HEV) and charge and discharge of a battery 300 that is mounted on the EV or HEV.

Figure 1:
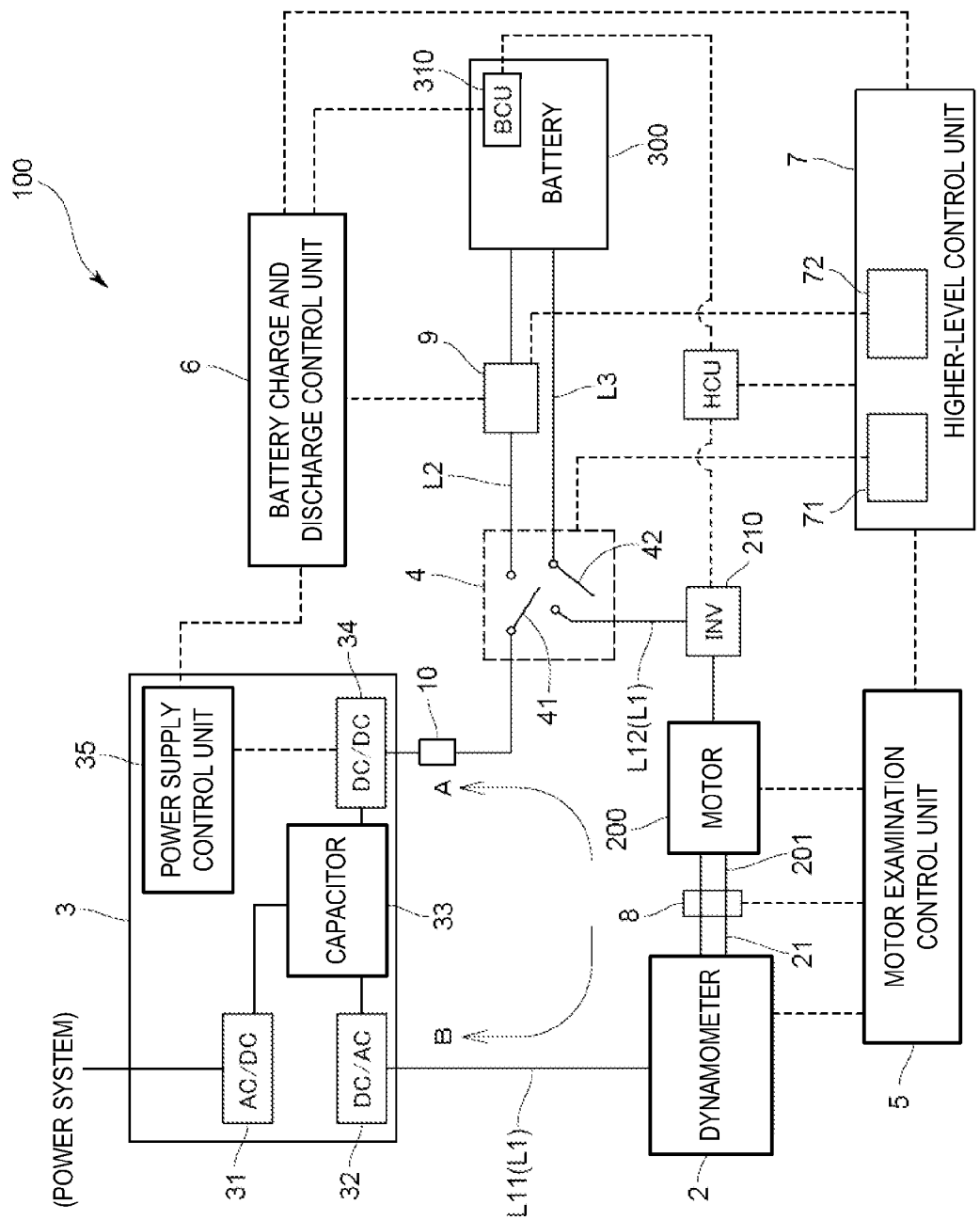
FIG. 1 is a view showing a configuration of an examination system for an electric vehicle according to one embodiment.
Figure 2:
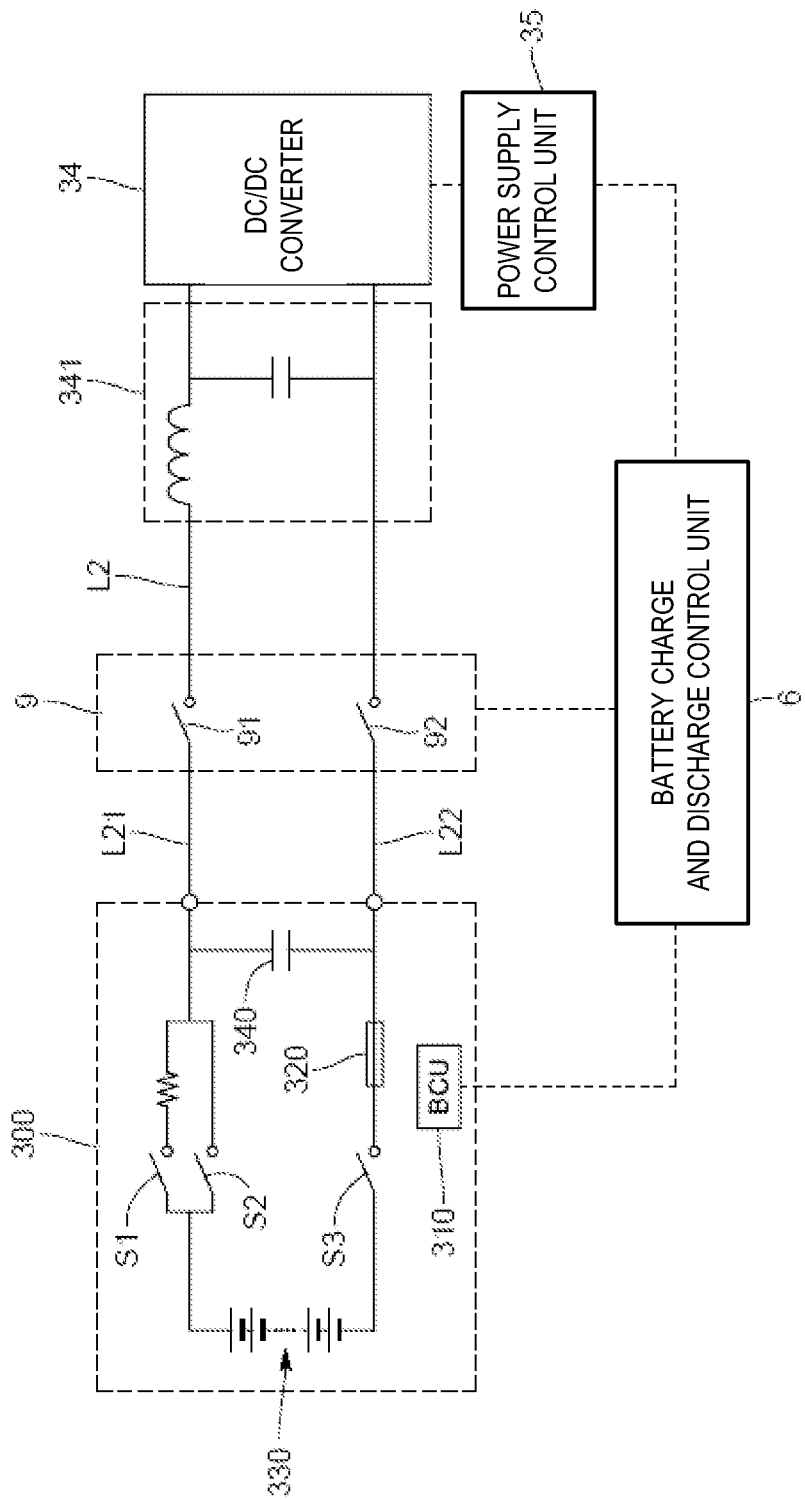
FIG. 2 is a view showing a configuration of a circuit for battery charge and discharge according to the same embodiment.

Specifically, as shown in FIG. 1, the system includes a dynamometer 2 connected with an output shaft of the motor 200 to be examined, a power supply unit 3 for supplying electric power to the motor 200 and the dynamometer 2, a motor examination circuit L1 for supplying electric power of the power supply unit 3 to the dynamometer 2 and the motor 200, a battery charge and discharge circuit L2 connected with the battery 300 to be examined, for supplying electric power of the power supply unit 3 to the battery 300 or discharging electric power of the battery 300, a battery motor connection circuit L3 connecting the battery 300 with the motor 200, a circuit switching mechanism 4 for switching among the motor examination circuit L1, the battery charge and discharge circuit L2, and the battery motor connection circuit L3, a motor examination control unit 5 for controlling the operating performance examination of the motor 200, a battery charge and discharge control unit 6 for controlling charge and discharge of the battery 300, and a higher-level control unit 7 for controlling the whole system. The battery 300 is an assembled battery comprised of a plurality of battery cells, such as lead rechargeable battery cells, which are connected in series or in parallel. Note that, each of the control units and other components shown in FIGS. 1 and 2 is connected through a signal line (each shown by a dashed line), and the control units and the other components connected with respective signal lines mutually transmit signals. Note that each of the control units and other components may be configured to mutually transmit the signals wirelessly.

The dynamometer 2 has a drive shaft 21 that is mechanically coupled to an output shaft 201 of the motor 200 through a joint member (not illustrated) so as to be separatable, and may be an alternate current generator, for example. The dynamometer 2 not only functions as an electric generator for generating power by the motor 200 rotating the drive shaft 21, but also functions as an electric motor where the drive shaft 21 rotated by supplying power from a power supply unit and the motor 200 coupled to the drive shaft 21 is used as an electric generator. The drive of the dynamometer 2 is controlled by the motor examination control unit 5.

Note that a torque sensor 8 is provided to the output shaft 201 coupled to the drive shaft 21 of the dynamometer 2, and a torque detection signal acquired by the torque sensor 8 is outputted to the motor examination control unit 5.

The power supply unit 3 includes an AC/DC converter 31 for converting the alternating current power received from the electric power system into direct current power, a DC/AC inverter 32 for converting the direct current power converted by the AC/DC converter 31 into alternating current power and outputting it to the dynamometer 2, a rechargeable unit 33, such as a capacitor, for accumulating the direct current power converted by the AC/DC converter 31, a DC/DC converter 34 for converting the direct current power charged by the rechargeable unit 33 or the direct current power converted by the AC/DC converter 31 into a desired voltage value, and a power supply control unit 35 for controlling these components.

The power supply control unit 35 controls the DC/DC converter 34 to adjust the direct current voltage output to the motor 200 or the battery 300 from the power supply unit 3. Specifically, in a motor examination mode (when the motor examination circuit L1 is closed by the circuit switching mechanism 4, as described later), the power supply control unit 35 adjusts the direct current voltage value of the power supply unit 3 which is outputted to the motor 200 (a motor inverter 210), whereas, in a battery charge and discharge mode (when the battery charge and discharge circuit L2 is closed by the circuit switching mechanism 4, as described later), the power supply control unit 35 adjusts the direct current voltage value of the power supply unit 3 which is outputted according to the desired state of charge (SOC) of the battery 300. The power supply control unit 35 is a dedicated or general-purpose computer provided with a CPU, a memory, an input/output interface, etc. The power supply control unit 35 controls the DC/DC converter 34 or other components when the CPU and peripheral equipment cooperate according to a power supply control program stored in the memory.

The motor examination circuit L1 includes a dynamo power supply circuit L11 for conducting current between the DC/AC converter 32 of the power supply unit 3 and the dynamometer 2, and a motor power supply circuit L12 for conducting current between the DC/DC converter 34 of the power supply unit 3, and the motor 200 and the motor inverter 210.

The battery charge and discharge circuit L2 is a circuit for conducting current between the DC/DC converter 34 of the power supply unit 3 and battery 300.

The battery motor connection circuit L3 is a circuit for connecting the battery 300, which is charged up and discharged down to the desired SOC, with the motor 200.

The circuit switching mechanism 4 has a switch 41 for switching between the motor examination circuit L1 and the battery charge and discharge circuit L2, and a switch 42 for switching between on and off of the battery motor connection circuit L3. The switch 41 is provided intervening between the motor power supply circuit L12 of the motor examination circuit L1 and the battery charge and discharge circuit L2, and is controlled by a switching mechanism control unit 71 set within the higher-level control unit 7. Moreover, the switch 42 is provided intervening between the motor power supply circuit L12 of the motor examination circuit L1 and the battery motor connection circuit L3, and is controlled by the switching mechanism control unit 71 set within the higher-level control unit 7.

The switching mechanism control unit 71 can acquire an input signal, for example, from a user, and switch among the circuits L1, L2 and L3 to which current is conducted. Alternatively, a sensor (not illustrated) for detecting that the battery 300 is connected with a power supply connector (not illustrated) provided in the battery charge and discharge circuit L2 may be provided to acquire the detection signal of this sensor and switch between the circuits L1 and L2 to which current is conducted. Moreover, the switching mechanism control unit 71 detects that the battery 300 reaches the desired SOC by the battery control unit 310 described later, sets the switch 41 to be connected with neither one of the circuits L1 and L2, and turns on the switch 42 to close the battery motor connection circuit L3.

The motor examination control unit 5 controls the whole motor examination in the electric vehicle examination system 100. The motor examination control unit 5 is a dedicated or general-purpose computer provided with a CPU, a memory, an input/output interface, etc. The motor examination control unit 5 controls the dynamometer 2, the motor 200 and other components by the CPU and peripheral equipment cooperating according to a motor examination control program stored in the memory.

Specifically, the motor examination control unit 5 controls the dynamometer 2 and the motor 200 to perform the motor examination as follows. That is, the motor examination control unit 5 finds an accelerator pedal depression amount and a brake pedal depression amount based on a vehicle driving pattern (for example, a traveling mode, such as 10.15 mode or 11 mode) which is inputted in advance to calculate a torque instruction (acceleration, deceleration), and controls drive of the motor 200 based on the torque instruction. Then, the torque sensor 8 detects a load torque generated at this time, and a theoretical acceleration then generated is calculated based on an amount of inertia and a travel resistance of the electric vehicle which are set in advance. Then, the dynamometer 2 is controlled so that an engine speed equivalent to a theoretical vehicle traveling speed which can be obtained by integrating the theoretical accelerations is obtained. Simultaneously, a target speed contained in the vehicle driving pattern is compared with the theoretical vehicle traveling speed and the torque instruction value is controlled so that a difference between the target speed and the theoretical vehicle traveling speed becomes zero, to rotate the motor 200 by a rotation pattern according to the target speed pattern.

The battery charge and discharge control unit 6 controls charge and discharge of the battery in the electric vehicle examination system 100, and is a dedicated or general-purpose computer provided with a CPU, a memory, an input/output interface, etc. The battery charge and discharge control unit 6 controls the power supply unit 3, the battery 300 and other components by the CPU and peripheral equipment cooperating according to a battery charge and discharge control program stored in the memory.

Specifically, the battery charge and discharge control unit 6 controls the power supply unit 3 according to the instruction from the higher-level control unit 7 based on the battery information acquired from the battery control unit 310 provided to the battery 300 so that the battery 300 reaches the desired state of charge (SOC). That is, the higher-level control unit 7 outputs a voltage and current to be outputted from the power supply unit 3 so that the battery 300 reaches the desired state of charge, to the power supply control unit 35 via the battery charge and discharge control unit 6. The power supply control unit 35 which acquired the voltage and current data controls the DC/DC converter 34 of the power supply unit 3 based on the voltage and current data.

Note that the battery control unit 310 (BCU) is a dedicated or general-purpose computer provided with a CPU, a memory, an input/output interface, etc. The battery control unit 310 detects a current, a voltage and a temperature of the battery 300, and based on them, calculates the state of charge (SOC) by the CPU and peripheral equipment cooperating according to a battery control program stored in the memory.

The higher-level control unit 7 switches between a motor examination mode where a motor examination is performed using the electric vehicle examination system 100 and a battery charge and discharge mode where charge and discharge of the battery are performed. The higher-level control unit 7 is a dedicated or general-purpose computer provided with a CPU, a memory, an input/output interface, etc. The higher-level control unit 7 manages the motor examination control unit 5 and the battery charge control unit 6 and functions as the switching mechanism control unit 71 for controlling the circuit switching mechanism 4, by the CPU and peripheral equipment cooperating according to a motor examination control program stored in the memory. Note that the higher-level control unit 7, the motor examination control unit 5, and the battery charge and discharge control unit 6 are configured so as to be able to perform wired or wireless communication with each other.

Specifically, the higher-level control unit 7 operates the switching mechanism control unit 71 to output to the switch 41 a control signal for switching the switch 41 of the circuit switching mechanism 4 to switch between the motor examination mode and the battery charge and discharge mode. In the motor examination mode, the motor examination circuit L1 (specifically, the motor power supply circuit L12) is closed, and in the battery charge and discharge mode, the battery charge and discharge circuit L2 is closed.

In addition, as shown in FIG. 2, the electric vehicle examination system 100 of this embodiment also includes an on/off switch 9 provided to the battery charge and discharge circuit L2, and a switch control unit 72 for controlling on and off of the on/off switch 9.

The on/off switch 9 is provided on the battery side and an output filter 341 comprised of an LC filter is provided on the output side of the DC/DC converter 34. In this embodiment, the on/off switch 9 is comprised of switches 91 and 92 which are provided in a line L21 connected with the positive terminal side of the battery 300 and a line L22 connected with the negative terminal side of the battery 300, respectively.

The switch control unit 72 is set in the higher-level control unit 7, and before switching from the motor examination circuit L1 to the battery charge and discharge circuit L2, the on/off switch 9 is turned off. Then, after switching from the motor examination circuit L1 to the battery charge and discharge circuit L2, when the output voltage of the power supply unit 3 and the voltage between the terminals of the battery 300 are the same, or when the difference becomes within a predetermined range, the on/off switch 9 is turned on.

The switch control unit 72 acquires the voltage detection signal from the voltage sensor 10 that detects the voltage on the power supply unit side of the on/off switch 9 (i.e., the output voltage of the DC/DC converter 34 of the power supply unit 3), and also acquires a voltage signal indicative of the voltage on the battery side from the on/off switch 9 (i.e., the voltage between the terminals from the BCU 310 built in the battery 300). Then, The switch control unit 72 determines whether the output voltage of the power supply unit 3 and the voltage between the terminals of the battery 300 which are acquired are the same, or whether the difference of the voltages is within the predetermined range. Note that the phrase "within the predetermined range" used herein means a voltage difference which produces a current value such that the circuits in the battery 300 are not cut off with a breaker 320 (for example, a fuse) built in the battery 300.

If the difference is not within the predetermined range, the higher-level control unit 7 then outputs the control signal to the battery charge and discharge control unit 6, the battery charge and discharge control unit 6 outputs the control signal to the power supply control unit 35 for controlling the output voltage of the power supply unit 3 so that the output voltage of the power supply unit 3 becomes the voltage between the terminals of the battery 300. Alternatively, the higher-level control unit 7 outputs the control signal to the BCU 310 for controlling the voltage between the terminals of the battery so that the voltage between the terminals of the battery 300 becomes the output voltage of the power supply unit 3.

Specifically, the higher-level control unit 7 turns on the switches S1 and S3 shown in FIG. 2 via the HCU, turns off the switch S2, and turns off the switches 91 and 92. Then, power is supplied to the capacitor from battery cells 330 in the battery, electric charges are accumulated according to the capacity of the capacitor 340 to produce a voltage (for example, 300V). Then, after the electric charges are accumulated in the capacitor 340, the higher-level control unit 7 turns off the switch S1 via the HCU, turns on the switches S2 and S3, turns on the switch 92, and turns off the switch 91 to control the voltage of the DC/DC converter 34 so that the output voltage of the DC/DC converter 34 (the voltage between the output terminals of the converter 34) becomes the voltage of the capacitor 340 (for example, 300V). Then, after the output voltage of the DC/DC converter 34 and the voltage of the capacitor 340 become the same voltage, the switch 91 is turned on.

Note that, since the switch 92 is turned on and the switch 91 is turned off to control the output voltage of the DC/DC converter 34, a reference voltage of the capacitor 340 and a reference voltage of the DC/DC converter 34 can be unified and, thus, the output voltage of the DC/DC converter 34 can easily be matched with the voltage of the capacitor 340. Moreover, an inrush current into the battery 300 can be prevented by the switches S1-S3, the breaker 320, and the capacitor 340, etc., which are provided in the battery 300.

Moreover, since the electric vehicle examination system 100 of this embodiment drives the motor 200 as an electric motor and drives the dynamometer 2 as a generator in the motor examination mode, regenerated power which is generated by the dynamometer 2 is charged into the rechargeable unit 33 in the power supply unit 3 (an arrow B of FIG. 1). Similarly, in the motor examination mode, since the system 100 drives the dynamometer 2 as an electric motor and drives the motor 200 as a generator, regenerated power which is generated by the motor 200 is charged into the rechargeable unit 33 in the power supply unit 3 (an arrow A of FIG. 1). Thus, since it is configured so that the regenerated power which is generated in the motor examination mode can be charged into the rechargeable unit 33, energy can be circulated within the motor examination circuit L1, thereby achieving energy saving.

According to the electric vehicle examination system 100 according to this embodiment configured in this way, the operating performance of the motor 200 and the like can be examined by the circuit switching mechanism 4 closing the motor examination circuit L1. Moreover, by closing the battery charge and discharge circuit L2 by the circuit switching mechanism 4, charge and discharge of the battery 300 can be performed and it can be adjusted to the desired state of charge (SOC). Thus, it is possible by the single system to perform the examination of the motor 200 mounted on the EV or HEV, and the charge and discharge of the battery 300 mounted on the EV or HEV. Therefore, since there is no necessity of providing a power supply unit only for the battery charge and discharge, an equipment cost and an installation space can be reduced. Furthermore, the battery charge and discharge circuit L2 charges and discharges the battery 300, and the battery 300 charged up to the desired state of charge (SOC) is connected with the motor 200 as it is by switching to the battery motor connection circuit L3, without moving the battery 300, an examination of the motor 200 using the battery 300 can also be performed.

Note that the present invention is not limited to the above embodiment.

For example, a behavior program indicating an actual behavior of the battery may be stored in the memory of the power supply control unit, and the power supply unit for supplying power to the motor in a motor examining device may function as a battery imitated device. Note that the behavior program may be configured using data where the battery is modeled. The power supply control unit may control the DC/DC converter and other components based on this behavior program.

Moreover, although the above embodiment uses the common power supply unit for the dynamometer and the motor, they may use different power supply units. In this case, one of the power supply units may be used for the charge and discharge of the battery.

Furthermore, although the embodiment is configured so that the switches are controlled by the switching mechanism control unit, the circuit switching mechanism may include one or more mechanical switches and the user may manually switch the mechanical switches.

Furthermore, the examination system for the electric vehicle of the above embodiment may be configured to perform a charge and discharge characteristic examination of the battery, a cycle life examination, etc. Specifically, a charge and discharge characteristic examination program or a cycle life examination program may be stored in the battery charge and discharge control unit, and an examination is performed by the CPU and peripheral equipment cooperating according to these programs.

Moreover, each control unit of the above embodiment may be physically formed in a separate device for every function, and the control units may be configured to perform wired or wireless communication with each other. Alternatively, the higher-level control unit and the motor examination control unit or the battery charge and discharge control unit may be configured to be physically integrated. Moreover, it may be configured so that the function of each control unit is replaced with another control unit.

The present invention is not limited to the above embodiment, and it may doubtlessly be modified variously without deviating from the scope of the present invention.

DESCRIPTION OF REFERENCE CHARACTERS

100 Electric Vehicle Examination System
200 Motor
201 Output Shaft
300 Battery
2 Dynamometer
3 Power Supply Unit
4 Circuit Switching Mechanism
L1 Motor Examination Circuit L2 Battery Charge And Discharge Circuit
71 Switching Mechanism Control Unit
72 Switch Control Unit
9 On/Off Switch

The invention claimed is:

1. An electric vehicle motor examination system, comprising:
   a dynamometer mechanically coupled to an output shaft of a motor that is used in an electric vehicle or a hybrid electric vehicle;
   a power supply unit configured to supply power to the motor or the dynamometer;
   a motor examination circuit configured to selectively supply the power of the power supply unit to the dynamometer and the motor;
   a battery charge and discharge circuit connected with a battery that is used in the electric vehicle or the hybrid electric vehicle, configured to supply the power of the power supply unit to the battery or discharge the power of the battery;
   a battery motor connection circuit connecting the battery with the motor and configured to supply the power of the battery to the motor; and
   a circuit switching mechanism configured to alternately switch among a first motor examination mode, a second motor examination mode, and a battery charge and discharge mode, wherein:
      in the first motor examination mode the circuit switching mechanism is configured to conduct electrical current from the power supply to the motor examination circuit and not to conduct electrical current from the battery motor connection circuit to the motor examination circuit, and also not to conduct electrical current from the power supply to the battery charge and discharge circuit; and
      in the second motor examination mode the circuit switching mechanism is configured to conduct electrical current from the battery motor connection circuit to the motor examination circuit and not to conduct electrical current from the power supply to the motor examination circuit, and also not to conduct electrical current from the power supply to the battery charge and discharge circuit; and
      in the battery charge and discharge mode the circuit switching mechanism is configured to conduct the electrical current from the power supply to the battery charge and discharge circuit, and not to conduct electrical current from either the battery motor connection circuit or the power supply to the motor examination circuit.

2. The electric vehicle motor examination system of claim 1, comprising:
   an on/off switch provided to the battery charge and discharge circuit, configured to close and open the battery charge and discharge circuit; and
   a switch control unit configured to control the on/off switch to turn on and off,
   wherein the switch control unit is configured to turn on the on/off switch when a difference between a voltage of the power supply unit and a voltage of the battery becomes within a predetermined range.

3. The electric vehicle motor examination system of claim 2, wherein the switch control unit is configured to turn off the on/off switch before switching from the motor examination circuit to the battery charge and discharge circuit, and after changing from the motor examination circuit to the battery charge and discharge circuit, the switch control unit is configured to turn on the on/off switch when the difference between the voltage of the power supply unit and the voltage of the battery becomes within the predetermined range.

4. The electric vehicle motor examination system of claim 1, wherein the motor is driven as an electric motor, and the dynamometer is driven as a generator to charge power generated by the dynamometer into the power supply unit, or the dynamometer is driven as the electric motor, and the motor is driven as a generator to charge power generated by the motor into the power supply unit.

5. The electric vehicle motor examination system of claim 1, further comprising a power control unit configured to adjust a voltage value of the power supply unit which is outputted to the motor, in the first motor examination mode, the power control unit being further configured to adjust the voltage value of the power supply unit which is outputted according to a desired state of charge (SOC) of the battery, in the battery charge and discharge mode.

6. The electric vehicle motor examination system of claim 1,
   wherein, when the battery is charged up to a desired state of charge (SOC) in the battery charge and discharge mode, and is then connected with the motor by switching the circuit switching mechanism, without moving the battery, to the second motor examination mode configured to conduct an examination of the motor using the battery.

7. An electric vehicle motor examination system, comprising:
   a dynamometer mechanically coupled to an output shaft of a motor that is used in an electric vehicle or a hybrid electric vehicle, the dynamometer being configured to absorb power of the motor and including an associated torque sensor provided on the output shaft of the motor;
   a power supply unit configured to supply power to the motor and the dynamometer;
   a motor examination circuit configured to selectively supply the power of the power supply unit to the dynamometer and the motor, the torque sensor being configured to output a torque detection signal to a motor examination control unit, and the motor examination control unit being configured to determine an output torque of the motor based on the torque detection signal;
   a battery charge and discharge circuit connected with a battery that is used in the electric vehicle or the hybrid electric vehicle, configured to supply the power of the power supply unit to charge the battery or discharge the power of the battery in a battery charge and discharge mode;
   a battery motor connection circuit connecting the battery with the motor and configured to supply the power of the battery to the motor; and
   a circuit switching mechanism configured to alternatively switch among a first motor examination mode, a second motor examination mode, and a battery charge and discharge mode, wherein:
      in the first motor examination mode the circuit switching mechanism is configured to conduct electrical current from the power supply to the motor examination circuit and not to conduct electrical current from the battery motor connection circuit to the motor examination circuit, and also not to conduct electrical current from the power supply to the battery charge and discharge circuit;
      in the second motor examination mode the circuit switching mechanism is configured to conduct electrical current from the battery motor connection circuit to the motor examination circuit and not to conduct electrical current from the power supply to the motor examination circuit, and also not to conduct electrical current from the power supply to the battery charge and discharge circuit;

in the battery charge and discharge mode the circuit switching mechanism is configured to conduct the electrical current from the power supply to the battery charge and discharge circuit, and not to conduct electrical current from either the battery motor connection circuit or the power supply to the motor examination circuit; and wherein, when the battery is charged up to a desired state of charge (SOC) in the battery charge and discharge mode, and is then connected with the motor by switching the circuit switching mechanism, without moving the battery, to the second motor examination mode configured to conduct an examination of the motor using the battery.

\* \* \* \* \*

UNITED STATES PATENT AND TRADEMARK OFFICE
CERTIFICATE OF CORRECTION

PATENT NO.         : 9,086,333 B2
APPLICATION NO.    : 13/162544
DATED              : July 21, 2015
INVENTOR(S)        : Richard Rumer et al.

Page 1 of 1

It is certified that error appears in the above-identified patent and that said Letters Patent is hereby corrected as shown below:

On the title page

Item (73), delete "Kyoto-shi (JP)" and insert --Troy, MI (US)--

Item (73), insert --HORIBA, Ltd., Kyoto-shi (JP)--

Signed and Sealed this
Twenty-eighth Day of June, 2016

Michelle K. Lee
*Director of the United States Patent and Trademark Office*